Dec. 27, 1955  H. C. KNARZER  2,728,582
MEANS FOR ADJUSTING THE HEIGHT OF LAWN MOWER CUT
Filed May 14, 1953
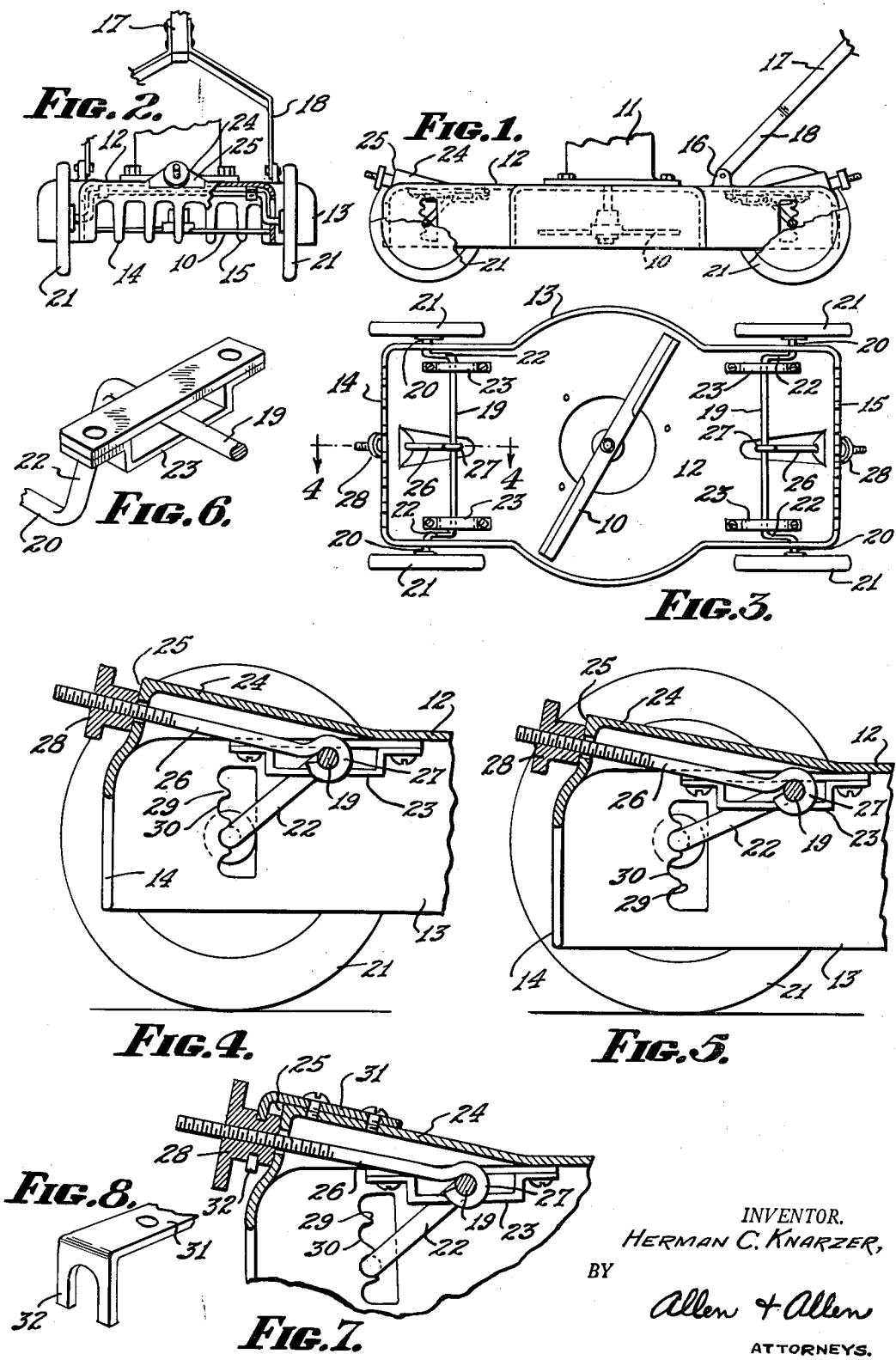
INVENTOR.
HERMAN C. KNARZER,
BY
Allen + Allen
ATTORNEYS.

United States Patent Office 2,728,582
Patented Dec. 27, 1955

2,728,582

MEANS FOR ADJUSTING THE HEIGHT OF LAWN MOWER CUT

Herman C. Knarzer, Richmond, Ind., assignor to Dille & McGuire Mfg. Co., Richmond, Ind., a corporation of Indiana Application May 14, 1953, Serial No. 355,015

9 Claims. (Cl. 280—43)

This invention relates to novel means for adjusting the height at which a lawn mower will cut, particularly lawn mowers of the type having a revolving blade driven by a motor.

An important object of my invention is to provide means which not only enable the height of lawn mower cut to be changed easily but which means also cooperate to produce a stable lawn mower construction.

Another object of my invention is to provide means of the type described which are simple to manufacture and operate.

A further object of this invention is to reduce to a minimum the working parts necessary to effect the desired adjustment.

Other objects and advantages of my invention will become apparent to those skilled in the art from the course of the following description and with reference to the accompanying sheet of drawings in which drawings like numerals are employed to designate like parts throughout and in which:

Figure 1 is a side elevation of a lawn mower embodying the principles of this invention, Figure 2 is a front elevation of the lawn mower of Figure 1 with parts broken away and part in section, Figure 3 is a bottom view, Figure 4 is an enlarged fragmentary sectional view taken on the line 4—4 of Figure 3, Figure 5 is a view similar to that of Figure 4 but showing a different position of the adjusting parts, Figure 6 is a fragmentary perspective of the guide stirrup, Figure 7 is a view generally similar to that of Figure 4 but showing a modified structure, and Figure 8 is a detailed perspective of a portion of the arrangement of Figure 7.

Referring now to Figures 1, 2 and 3 it will be observed that my invention is shown as applied to a lawn mower of the type having a blade 10 which may be rotated in a horizontal plane and driven by a motor mounted at 11. The blade 10 is mounted for rotation within a housing comprised of a top member 12 and a skirt 13. The member 12 and skirt 13 may be formed as a single unit. Also, at the forward and rear end of the lawn mower the skirt 13 is formed so as to provide rake-like teeth 14 and 15 respectively. The member 12 mounts the motor apparatus generally indicated at 11 and also lugs 16 to which the handle 17 is secured via the fork element 18. The construction so far described is more or less conventional in this type of lawn mower.

A pair of axles 19 are provided and it will be understood that these axles may be identical. Each such axle is generally U-shaped and each such axle is further bent to provide wheel bearing extensions struck outwardly from the lower ends of the legs of the U. These wheel bearing portions are indicated at 20. The various wheels may be identical and are, therefore, each designated by the reference numeral 21. Each of the legs of the U-shaped axle is designated at 22.

The means by which each of the axles 19 and its associated parts is mounted is the same and, therefore, a description of the manner of mounting only one of these axles 19 will be given. It will be obvious to those skilled in the art that such teachings may be applied equally as well to the other of the axle members.

As best seen in Figures 3 and 6 it will be observed that the axle member 19 is mounted within the housing formed by the members 12 and 13 by a pair of stirrup or guide members generally indicated at 23, which guide members may be bolted, riveted, welded or otherwise attached to the underside of the member 12. The stirrup 23 is of a size to permit rotation of the axle 19 about its axis and also to permit the axle 19 to be shifted in a horizontal plane.

The member 12 is shaped so as to provide a housing 24 and a bearing surface 25. This housing 24 is located centrally of the body of the lawn mower as indicated in the figures. A threaded rod 26 has an engagement with the axle 19 as indicated at 27 and carries a nut 28 which may be screwed against the bearing portion 25. It will be observed that the rod 26 is thus mounted within the housing 24.

The skirt 13 is cut away at four different places to permit the wheel bearing portions 20 of the axles 19 to extend through such skirt so that, of course, the wheels 21 may be mounted outwardly of the housing defined by the members 12 and 13. These cut-away portions are similar and a description of one will serve as a description of all. Each of these cut-away portions defines a series of notches made up of hills 29 and valleys 30. The cut-away portion is large enough to permit the wheel bearing axle member 20 to clear the hills 29 when desired as will be described shortly. Several such hills and valleys are defined by each cut-away portion of the skirt 13.

It will be apparent that the hills 29 and valleys 30 define a series of notches each of which is of a size sufficient to receive the axle portion 20 in snug fashion. The members 20 are maintained in the desired notches by tightening the nut 28 against the bearing surface 25 of the housing 24. This causes the threaded rod 26 to pull the axle member 19 so as to jam the parts tightly together and prevent accidental dislodging of the axle members 20 from their respective notches. As stated, the stirrup 23 will permit the necessary shifting of the axle 19 to accomplish this. The notches are preferably disposed in substantially vertical rows and it will be understood that this language includes arrangements wherein the various notches are disposed more or less diagonally.

In operation, and referring first to Figure 4, it will be apparent to those skilled in the art that the height at which the lawn mower blade 10 will cut depends on which of the various notches receive the axle members 20. In Figure 4 there is shown one position of the parts which will enable the operator to cut the grass at a given level. Should the operator wish to adjust the law mower so that a closer cut may be obtained, this invention as embodied in the structure described will permit such change easily. When the nut 28 is loosened the weight of the lawn mower assembly as mounted on the housing 12 will cause the axle member 20 to ride over the hills 29 as the assembly moves toward the ground. Upon the lawn mower assembly reaching the desired elevation the operator will again tighten the nut 28 so as to draw the axle member 19 towards it thereby jamming the axle portion 20 in the desired notch. This, for example, could be the arrangement shown in Figure 5.

On the other hand, should it be desired to go from the position of Figure 5 to that of Figure 4, upon loosening the nut 28 it might be necessary to jiggle the lawn mower assembly so as to disengage the axle member 20 from its notch. In addition, the operator will have to lift the assembly upwards until the arm 22 and member 20 fall to a position adjacent one of the lower notches. At this time the nut 28 is again tightened with the result that the member 20 is jammed firmly within the desired notch. In this manner the blade 10 may be moved away from the ground to provide a cut which permits a greater amount of grass to remain.

In Figures 7 and 8 I have illustrated a modification of my invention. As before, like numerals are employed to designate like parts. This embodiment comprises the addition of a plate 31 having fork members 32 adapted to engage within a groove provided in the nut 28. The plate 31 is fixed to the upper portion of the housing 24. In this arrangement, when the nut 28 is turned so as to permit the axle member 20 to come free of its notch, the rod 26 will be positively moved since the nut 28 is prevented from axial movement by reason of the plate 31 and its fork 32 which cooperates with the groove in the member 28. This provides for positive displacement of the axial member 20 and eliminates the jiggling movement which might be necessary in order to dislodge the axial member 20 in the arrangement shown in Figures 1 through 6. In these first figures, when the nut 28 is loosened it might be that it will simply ride on the threaded portion of the rod 26 in a direction away from the bearing surface 25 without the member 20 actually and immediately being dislodged from its notch in order to permit the desired adjustment. In this case, as mentioned, it might be necessary for the operator to jiggle the lawn mower assembly until the rod 26 advances to permit the member 20 to come free of its notch. As stated, the modification of Figures 7 and 8 provides for positive movement of this rod by preventing the nut 28 from riding up the threaded portion away from the surface 25.

By my invention I have provided an arrangement wherein for each set of wheels, that is, the front pair of wheels or the rear pair of wheels, it is necessary to loosen only one nut in order to obtain the proper adjustment. This differs from those structures known to me and now in use wherein it is necessary to make a separate adjustment for each wheel. Thus, by the simple process of manipulating two nuts, the lawn mower assembly may be completely adjusted with respect to all four of its ground engaging wheels. In many of the prior structures known to me it has been necessary to manipulate two nuts for each wheel.

A further distinction and advantage of the invention lies in the fact that when the nuts 28 are tightened so as to secure the axle members 20 in the desired notches, the major portion of the axle as indicated at 19 serves as a brace for the housing structure defined by the members 12 and 13. This bracing action due to the cooperation of the axle 19, rod 26 and nut 28 serves to produce a very stable construction for the lawn mower when in use.

This cooperation of a pair of nuts and a pair of axles to produce an arrangement which provides for the easy and rapid adjustment of the lawn mower blade with respect to the height of cut desired and which at the same time stabilizes the lawn mower assembly is believed novel with me and has proved highly desirable. It will be understood that the detailed arrangements of Figures 4 and 5, which happen to show the front end of the lawn mower, may be repeated at the rear end thereof and, consequently, only one of these arrangements has been shown.

It will be further understood that modifications and changes may be effected in the embodiments of my invention without departing from the scope and spirit thereof, and while I have shown my invention as being embodied in certain structures by way of example I do not intend to be limited to such structures except insofar as they are specifically set forth in the sub-joined claims.

Having thus described my invention, what I claim as new and what I desire to protect by United States Letters Patent is:

1. In a lawn mower assembly including a base and a skirt depending therefrom, a pair of axles, means to secure said axles to said base, rows of substantially vertically disposed notches in said skirt to receive the wheel bearing ends of said axles, and releasable toggle means to shift said wheel bearing ends from one notch to another and maintain them in the desired notches, said notches being defined by cutaway portions in said skirt leaving a series of hills and valleys, said cut-away portions being large enough to permit a wheel bearing axle end to move freely over a hill in passing from one valley to another, whereby in moving from one valley to another a wheel bearing axle end remains within its respective cutaway portion.

2. In a lawn mower assembly including a base and a skirt depending therefrom, a pair of generally U-shaped axles having wheel bearing ends extending outwardly from the legs of the U and parallel to the bridge of the U, means to secure said axles to said base, rows of substantially vertically disposed notches in said skirt to receive said wheel-bearing ends, and means to shift said wheel-bearing ends from one notch to another and maintain them in the desired notches.

3. The arrangement of claim 2 in which the means for securing each of the axles to the base comprises a pair of stirrup guide members which permit shifting of the bridge of the U in a horizontal plane.

4. The arrangement of claim 2 in which said notches are defined by cut-away portions in said skirt leaving a series of hills and valleys, said cut-away portions being large enough to permit a wheel bearing axle end to move over a hill in passing from one valley to another.

5. The arrangement of claim 2 in which said shifting and maintaining means comprises a threaded rod extending through said base and engaging said U centrally thereof, a bearing surface, and a nut on said threaded rod adjacent said bearing surface, whereby upon loosening said nut the bridge of said U-shaped axle may shift in said stirrup guides to permit said wheel bearing axle ends to move from one notch to another, tightening of said nut serving to draw the bridge of said U-shaped axle towards said bearing surface whereby said wheel bearing axle ends are jammed in said last mentioned notches.

6. The arrangement of claim 5 in which said base is provided with a housing for said threaded rod, the end of said housing comprising said bearing surface.

7. In a lawn mower assembly including a base and a skirt depending therefrom, a pair of U-shaped axles, each axle having a wheel bearing portion extending outwardly from each of the legs of the U, a pair of stirrup guide members for each axle to hold said axles adjacent said base and to permit shifting of said axles in a horizontal plane, cut-away portions in the skirt adajcent each of said wheel bearing portions and defining notches disposed in a substantially vertical row to receive said wheel bearing portions, said notches being comprised of alternate hills and valleys, said cut-away portions being large enough to permit a wheel bearing portion to ride over a hill in moving from one valley to another, a threaded rod engaging each axle centrally of the bridge of the U, said rod extending through said base, a bearing surface, and a nut on said threaded rod adapted to engage said bearing surface, whereby tightening of said nut causes said wheel bearing portions to be secured in certain of the notches and the bridge of the U to stabilize the lawn mower assembly, loosening of said nut permitting the wheel bearing portions to be moved from one notch to another to vary the distance of the lawn mower assembly from the ground.

8. In a lawn mower assembly including a base and a skirt depending therefrom, a pair of axles, means to secure said axles to said base, rows of substantially vertically disposed notches in said skirt to receive the wheel-bearing ends of said axles, and means to shift said wheel bearing ends from one notch to another and maintain them in the desired notches, said last mentioned means comprising a threaded rod extending through said base and engaging a said axle centrally thereof, a bearing surface, and a nut on said threaded rod adjacent said bearing surface, whereby upon loosening said nut the wheel-bearing ends of the axle may be moved from one notch to another, tightening of said nut serving to jam the wheel-bearing ends of the axle in said last mentioned notches, said notches being defined by cutaway portions in said skirt leaving a series of hills and valleys, said cutaway portions being large enough to permit a wheel bearing axle end to move freely over a hill in passing from one valley to another, whereby in moving from one valley to another a wheel bearing axle end remains within its respective cutaway portion.

9. In a four-wheel lawn mower assembly including a base having a vertical slot therein for each wheel; two axles, each comprising a major portion and at each end a parallel, offset, wheel-carrying portion passing through a said slot and vertically moveable therein; means securing said major portions to said base and permitting the fore-and-aft sliding movement of said major portions with respect to said base; a series of notches communicating with each said vertical slot, said wheel carrying portions being engagable in said notches; and releasable toggle means for locking each of said axles in position with the wheel-carrying portions engaged in selected pairs of said notches.

References Cited in the file of this patent

UNITED STATES PATENTS

| | | |
|---|---|---|
| 734,076 | Loeb | July 21, 1903 |
| 736,697 | Cummins | Aug. 18, 1903 |
| 1,396,128 | Kopplin | Nov. 8, 1921 |
| 2,152,946 | Barltrop | Apr. 4, 1939 |
| 2,708,119 | Best | May 10, 1955 |

FOREIGN PATENTS

| | | |
|---|---|---|
| 117,178 | Great Britain | July 11, 1918 |